United States Patent [19]

Metz et al.

[11] Patent Number: 5,268,111
[45] Date of Patent: Dec. 7, 1993

[54] CONCRETE RECLAMATION SYSTEM WITH MIXING AGITATOR

[76] Inventors: Jeffrey L. Metz, 4000 Highway 78 South; Joel R. Metz, 4232 Highway 78 South, both of Gratiot, Wis. 53541; Lawrence J. Glendenning, 15486 County Shop Rd., Darlington, Wis. 53530

[21] Appl. No.: 830,067
[22] Filed: Feb. 3, 1992
[51] Int. Cl.$^5$ .............................................. B03D 3/00
[52] U.S. Cl. ........................................ 210/712; 209/2; 209/18; 210/141; 210/194; 210/208; 210/258; 210/738; 366/40; 366/43; 366/136; 366/196
[58] Field of Search ................... 366/30, 40, 42, 43, 366/132, 136, 137, 189, 192, 194, 195, 196, 606; 209/2, 18, 10, 17; 106/745, 756; 210/141, 143, 208, 248, 257.1, 258, 296, 298, 319, 523, 738, 739, 772, 800, 803, 805, 194, 712

[56] References Cited

U.S. PATENT DOCUMENTS

| | | | |
|---|---|---|---|
| 4,548,507 | 10/1985 | Mathis et al. | 366/192 |
| 5,149,192 | 9/1992 | Hamm et al. | 366/43 |

Primary Examiner—Joseph W. Drodge
Attorney, Agent, or Firm—Stroud, Stroud, Willink, Thompson & Howard

[57] ABSTRACT

A separation and reclamation apparatus for separating a first discrete-phase solids material from a fluid mixture including, in addition, a second discrete-phase solids material and a continuous-phase carrier fluid, has a unitary vessel having a discharge tank connected to a receiving tank and in fluid communication therewith through an opening on the bottom side wall of the receiving tank. The receiving tank both mixes and transports the mixture. A controller actuates a door over the opening for transport of the first discrete-phase solids material out of the receiving tank into the discharge tank via a conveyor having an open discharge end higher than the top of the receiving tank. The apparatus includes a pump arranged to intake material from the discharge tank from contents remaining in the vessel after removal of the first discrete-phase solids. The invention defines methods for treating the fluid mixture to cause the first discrete-phase solids material to separate out of the mixture while maintaining constant mixing of the remainder mixture maintaining the second discrete-phase solids material in suspension. The invention is applied to reclamation of unused fluid ready-mix concrete, whereby sand and aggregate are recovered therefrom, and the remainder mixture of water, cement and sand fines is used in mixing fresh batches of concrete.

45 Claims, 5 Drawing Sheets

CONCRETE RECLAMATION SYSTEM WITH MIXING AGITATOR

TECHNICAL FIELD

This invention relates to apparatus and methods for concrete fabrication. More particularly, this invention relates to apparatus and methods for classifying solids, and especially as applied to reclaiming concrete mix returned to a ready-mix plant by concrete delivery trucks in the course of a day's production.

BACKGROUND OF THE INVENTION

Concrete batch fabrication plants are well known and typically comprise a source of plant water, and storage facilities for storing fresh cement powder, sand, and gravels or other aggregates of various sizes to be admixed with the cement powder and water when a batch of concrete is made. Such plants, typically called "ready-mix" plants, are under the control of an operator, and may have a computerized batching console for selecting the proportions of the various constituents to be admixed. In this latter type of installation, the batching console is monitored by the plant operator. Fresh batched concrete mix is dispensed into one or more waiting trucks each having a revolving drum which is used to transport the fresh batched concrete mix to one or more job sites for pouring. After a concrete pour has been made, each truck typically returns to the concrete fabrication plant where a fresh batch of concrete is poured into the truck mixing drum for transport to the job site. This cycle continues throughout the production day, or until no more fresh concrete mix is required at any of the job sites. At the end of a production day, each truck is washed out to remove the accumulated deposits within the mixing drum, and parked until the next production day.

For years, the concrete remaining in a returning truck was simply dumped in the yard and permitted to harden, and was later hauled away for use as land fill. This arrangement was wasteful in that reusable constituents of the returned concrete were being thrown away. In addition, the dumping of returned concrete in a yard was environmentally unsound.

Accordingly, various types of apparatus have been designed for reclaiming some or all of the components of the returned concrete mixture, to provide a less environmentally damaging operation.

In a relatively recent development, U.S. Pat. No. 4,226,542 issued to Black et al, teaches a partial separation of the slurry of cement and water, wherein water from the slurry is clarified and reused as water within the ready-mix plant. The heavier cement and sand slurry solids are allowed to settle out of the slurry. Both the slurry solids and the clarified water are re-used, so landfilling is avoided. But the Black et al system is relatively complex and costly, as both the slurry solids and the clarified water must be monitored and controlled.

There remains a need for reclamation apparatus and methods, for reclaiming fluid concrete mix, which are economical to obtain and use. Such apparatus and methods should use a minimum amount of water and other resources, should be simple to use and maintain, and should fit economically into the routine operation of the concrete plant.

SUMMARY OF THE DISCLOSURE

In one aspect, this invention provides improved reclaiming apparatus which can reclaim an entire day's supply of unused fluid concrete mix, and provide the elements thereof for reuse the following day, and can do so at moderate cost, with minimal use of water and minimal monitoring and treating of the elements of the mix.

As a more specific aspect, the invention maintains the cement and water in a constantly mixed remainder mixture with a minimal amount of diluting water, until the slurry is used in making up fresh batches of fluid concrete mix.

Still another aspect of the invention is providing a concrete ready-mix plant which incorporates therein the reclaiming apparatus of the invention.

In a broader sense, the invention provides a novel and improved solids classifying system for settling out a first discrete-phase solids element while maintaining a second discrete-phase solids component in suspension by constant mixing of the mixture.

As used herein, the term "aggregates" refers to relatively larger solid admixtures in the concrete, wherein the particles of such admixtures are larger than the particles of the typically used sand. Typical of such aggregates are gravel and other minerals, but the term as used herein also includes components which are being recycled, such as ground glass and previously used concrete. All such virgin and recycled materials, which are not part of the cement component, or part of the sand component, are thus included in the term "aggregates."

Some of the foregoing and other aspects of the invention are realized in a reclaiming apparatus for reclaiming an unused fluid concrete mixture comprising water, cement, sand, and aggregate, for use in production of fresh concrete, the reclaiming apparatus comprising a unitary liquid containment vessel. The liquid containment vessel comprises a receiving tank, having a bottom, a top, and an opening (outlet port) therein at its bottom. The receiving tank comprises mixing means adapted to maintain constant mixing of the contents of the receiving tank, is configured and dimensioned to receive the unused fluid concrete mixture and to mix the received concrete mixture with diluting water, such that the diluting water in combination with constant mixing effects separation of the concrete, whereby sand and aggregates settle to the bottom of the receiving tank while the cement solids and a fines portion of the sand remain in a generally uniformly dispersed mixture in the water. The liquid containment vessel also comprises a discharge tank, connected with the receiving tank, in fluid-containing relationship therewith, through the opening at the bottom of the receiving tank, such that material in the receiving tank can be discharged from the receiving tank through the opening and into the discharge tank. The discharge tank has therein a conveyor in a biased conduit. The conveyor, and preferably the discharge tank, have a receiving end adjacent the opening in the receiving tank and disposed to receive material discharged from the receiving tank through the opening, and a discharge end disposed at a height higher than the highest normal fluid level in the fluid containment vessel, whereby the levels of fluid in the discharge tank and the receiving tank are substantially the same. A door is disposed over the opening in the receiving tank, controlled by control means (e.g. an actuator), for opening the door in a predetermined sequence for transport of sand and aggregates from the receiving tank to the discharge tank, and thereby to the receiving end of the conveyor, and for closing the door to prevent transport of sand and aggregates from the receiving tank to the discharge tank. Transport means in the receiving tank transports sand and aggregates along the bottom of the receiving tank to the opening, and urges the sand and aggregates through the opening. Accordingly, the sand and aggregates are received in the discharge tank at the receiving end of the conveyor, are transported by the conveyor to its discharge end and are thereby discharged from the conveyor, and thus from the discharge tank and the unitary liquid containment vessel.

The reclaiming apparatus preferably includes transfer means, such as a pump, and intake piping mounted to draw intake fluid to the pump from the discharge tank, to transfer the remainder mixture of cement and water from the unitary liquid containment vessel to a concrete delivery truck. The pump and piping can define both a discharge opening for discharging the mixture of cement and water into a truck, and a recycle transport loop between the pump and the liquid containment vessel, with controls to automatically activate the pump and thereby effect pumping of fluid through the recycle loop with the truck discharge opening closed, at prescribed time intervals, to thus maintain fluidity of the mixture of water, cement, and sand fines in the pump and the recycle loop.

The transport means in the receiving tank preferably comprises an impeller having blades mounted for rotation parallel to and adjacent the bottom of the receiving tank. The blades transport sand and aggregates along the bottom of the receiving tank and to the opening at the bottom thereof, and urge the sand and aggregates through the opening. In some embodiments, the blades preferably have top surfaces defining angles of about 15 degrees with the bottom of the receiving tank, and extending upwardly and rearwardly with respect to the direction of rotation of the blades.

The reclaiming apparatus preferably includes control means to activate the conveyor and the pump, to electrically lock out the pump when the conveyor is activated, and to electrically lock out the conveyor when the pump is activated, as well as to open the door when either the pump or the conveyor is activated and to close the door when neither the pump nor the conveyor is activated.

Another aspect of the invention is represented by a concrete ready-mix plant having a maximum daily capacity for mixing and delivering ready-mix concrete. The concrete ready-mix plant comprises means for mixing cement, water, sand, and aggregate to make a fluid ready-mix concrete mixture and for delivering the fluid concrete mixture to users thereof; and the reclaiming apparatus disclosed herein for reclaiming unused portions of the fluid concrete mixture, for use in production of fresh ready-mix concrete.

Broadly conceived, the invention comprises a solids classifying system, for separating solids material from a mixture which comprises a first discrete-phase solids component to be recovered therefrom, a second discrete-phase solids component to be retained therein, and a continuous-phase carrying fluid. The solids classifying system generally includes a unitary liquid containment vessel, which comprises a receiving tank, having a bottom, a top, and an opening therein at the bottom thereof. The receiving tank comprises mixing means to maintain constant mixing of the contents of the receiving tank, is adapted to receive an appropriately classifiable mixture and to mix the received mixture with a treating quantity of treating material, such that the treating material in combination with constant mixing effects separation of the mixture, whereby the first discrete-phase solids component settles to the bottom of the receiving tank while the second discrete-phase solids component remains in a generally uniformly dispersed mixture in the fluid therein. The liquid containment vessel also comprises a discharge tank, connected with the receiving tank, in fluid-containing relationship therewith, through the opening at the bottom of the receiving tank, such that material in the receiving tank can be discharged from the receiving tank through the opening into the discharge tank. The discharge tank has therein a conveyor. The conveyor has a receiving end adjacent the opening in the receiving tank and disposed to receive material discharged from the receiving tank through the opening, and a discharge end disposed at a height higher than the top of the receiving tank, whereby the fluid levels in the discharge tank and the receiving tank are substantially the same. A door is disposed over the opening in the receiving tank, and is controlled by control means whereby the door can be opened for transport of the first discrete-phase solids from the receiving tank to the discharge tank and thereby to the receiving end of the conveyor, and can be closed to prevent transport of the first discrete-phase solids from the receiving tank to the discharge tank. Transport means in the receiving tank transports the discrete-phase solids along the bottom of the receiving tank to the opening, and urges the discrete-phase solids through the opening. Thus the discrete-phase solids are received in the discharge tank at the receiving end of the conveyor, are transported by the conveyor to its discharge end, and are discharged from the conveyor, and thus from the discharge tank and the unitary containment vessel.

The transport means in the receiving tank can comprise an impeller as described herein above, to urge the discrete-phase solids through the opening.

Another aspect of the invention comprises a method of separating solids material from a mixture comprising a first discrete-phase solids component to be recovered therefrom, a second discrete-phase solids component to be retained therein, and a continuous phase carrying fluid, in separating apparatus which includes a unitary liquid containment vessel having a receiving tank, the receiving tank having a bottom and a top, comprising mixing means adapted to maintain constant mixing of the contents of the receiving tank, being adapted to receive a mixture subject to separation, and to mix the received mixture with a treating quantity of a treating material, such that the treating material in combination with constant mixing effects separation of the mixture whereby the first discrete-phase solids component settles to the bottom of the receiving tank while the second discrete-phase solids component remains in a generally uniformly dispersed mixture in the carrying fluid, the receiving tank having an opening therein at the bottom thereof. The unitary containment vessel also includes a discharge tank, connected with the receiving tank, in fluid-containing and fluid-communicating relationship therewith, through the opening such that material in the receiving tank can be discharged from the receiving tank through the opening into the discharge tank. The discharge tank has therein a conveyor, the conveyor having (i) a receiving end thereof adjacent the opening in the receiving tank, and disposed to receive material discharged from the receiving tank through the opening, and (ii) an open discharge end disposed at a height higher than the top of the receiving tank, whereby the level of fluid in the discharge tank and the level of fluid in the receiving tank are substantially the same. A door is disposed over the opening in the receiving tank. Control means can open the door for transport of the first discrete-phase solids from the receiving tank to the discharge tank and thereby to the receiving end of the conveyor, and can close the door to prevent transport of the discrete-phase solids from the receiving tank to the discharge tank. Transport means in the receiving tank is adapted to transport the discrete-phase solids along the bottom of the receiving tank to the opening, and to urge the first discrete-phase solids through the opening. The method in accordance with the present invention comprises the steps of receiving the mixture into the receiving tank; diluting the mixture with a diluting quantity of the treating material in the receiving tank and continuously mixing the contents of the receiving tank to create a relatively more dilute mixture thereof, whereby the first discrete-phase solids settle to the bottom of the receiving tank and are transported to and urged through the opening and to the receiving end of the conveyor; conveying the first discrete-phase solids, by the conveyor, from the receiving end of the conveyor to the discharge end thereof, and discharging the first discrete-phase solids from the mixture and from the unitary liquid containment vessel, thereby separating the first discrete-phase solids component from the mixture.

The preferred mixture is unused, fluid ready-mix concrete, whereupon the discrete-phase solids component is a mixture of sand and aggregates, and the contents remaining in the unitary liquid containment vessel after discharge of the sand and aggregates comprises a remainder mixture of water, cement, and a fines portion of sand. The method further preferably includes pumping the remainder mixture back into ready-mix trucks and thereby using the remainder mixture as an ingredient in the make-up of fresh ready-mix concrete. The method also preferably includes pumping portions of the remainder mixture material through a recycle loop, with the truck discharge opening closed, at prescribed time intervals, to maintain fluidity of the remainder mixture in the pumping system.

The method can also include selecting, as the transport means an impeller having blades mounted for rotation parallel to, and adjacent, the bottom of the receiving tank, the blades having top surfaces defining angles of about 15 degrees with the bottom of the receiving tank, the angles extending, from leading edges of the blades adjacent the bottom of the receiving tank, upwardly and rearwardly with respect to the direction of rotation of the blades. The blades transport the first discrete-phase solids along the bottom of the receiving tank and to the opening at the bottom thereof and urge the first discrete-phase solids through the opening, while providing mixing of the remainder mixture of cement, water, and sand fines.

DETAILED DESCRIPTION OF THE ILLUSTRATED EMBODIMENTS

Figure 1:
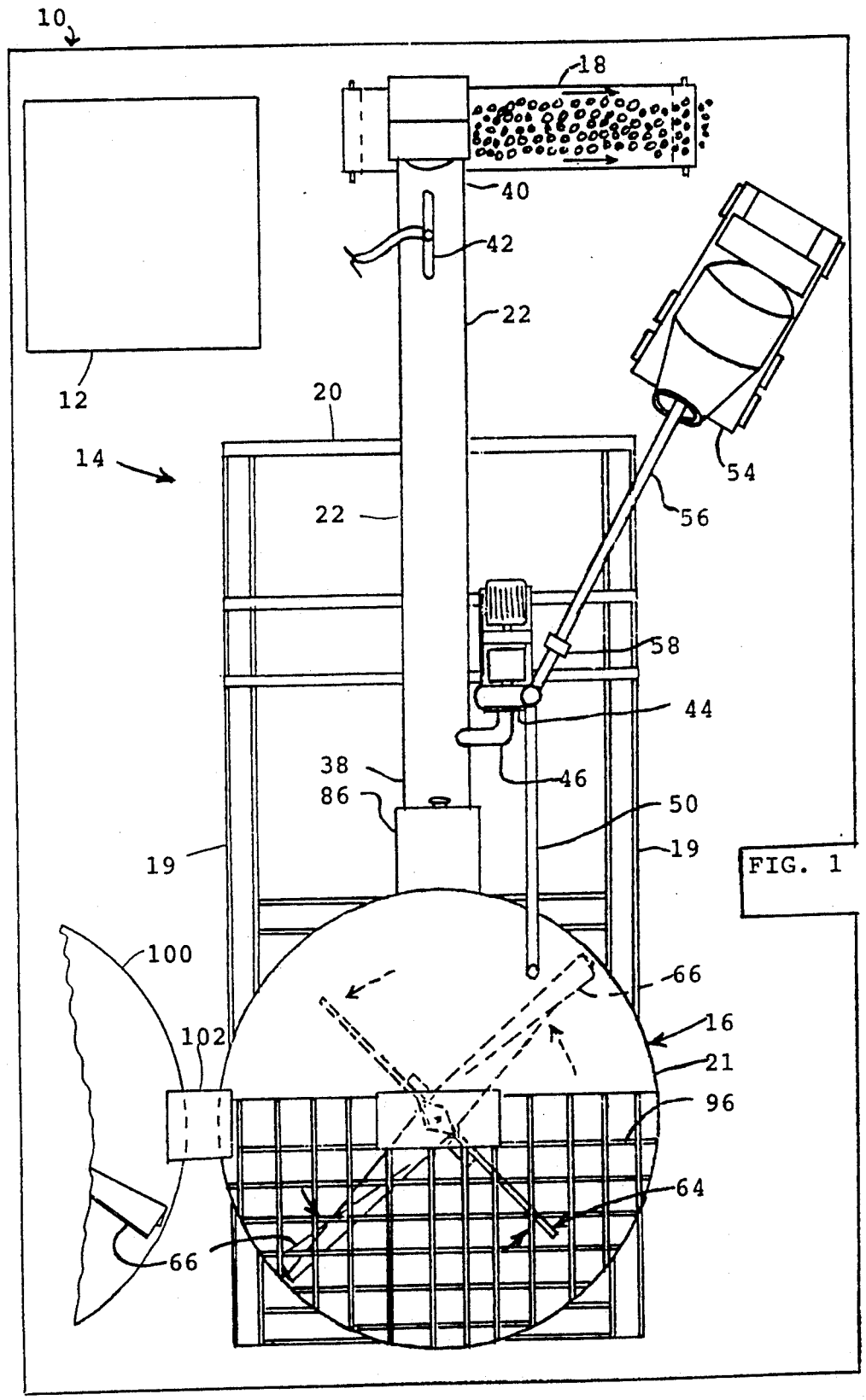
FIG. 1 is a top view of a ready-mix plant of this invention, including the reclaiming apparatus disclosed herein, including a cut away section of a mixing tank.

Reference is initially made to FIG. 1 which illustrates the overall concept surrounding the invention; namely the incorporation of materials reclaiming apparatus within the concrete ready-mix plant. The ready-mix plant itself is only generically shown in FIG. 1 as a general outline. The ready-mix plant 10 includes a general operating area much of which is not shown in the drawings, a command and control center 12, and reclaiming apparatus generally designated 14. The reclaiming apparatus 14 generally comprises a unitary liquid containment vessel 16 and its associated equipment, and optional sand and aggregate conveyor 18.

Figure 2:
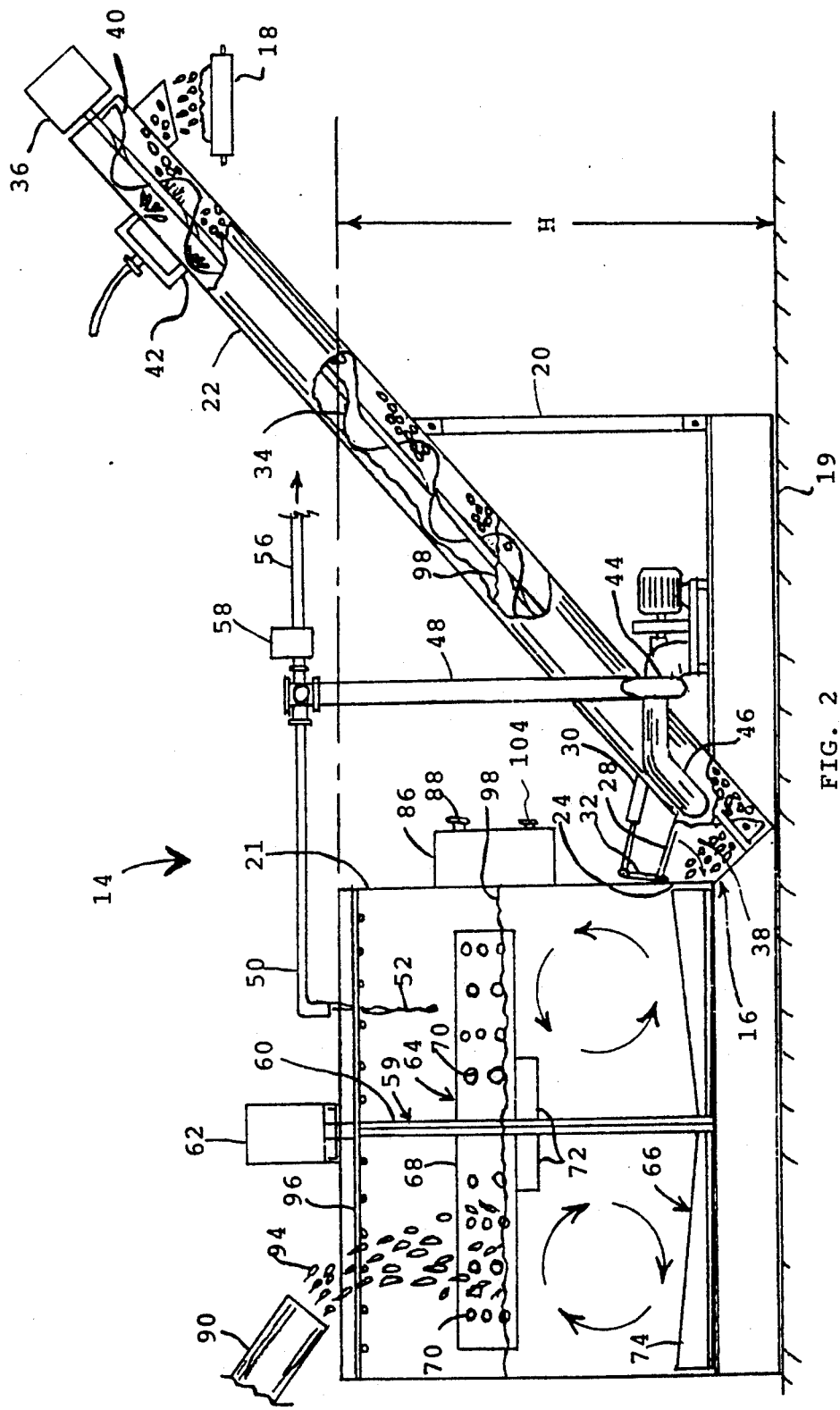
FIG. 2 is a side elevation view of the reclaiming apparatus, with cut away sections to show the conveyor.
Figure 3:
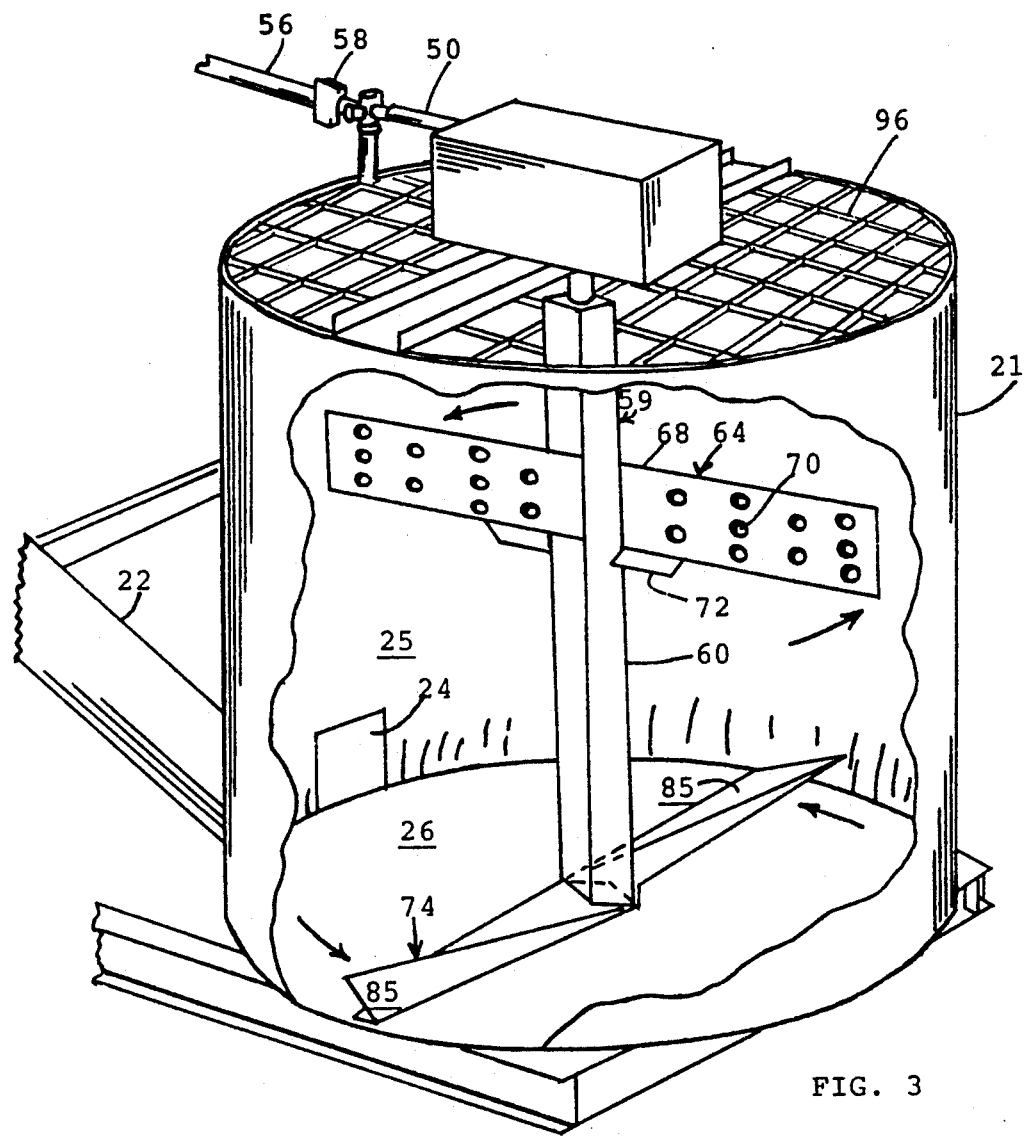
FIG. 3 shows a perspective cut-away view of the receiving tank.
Figure 4:
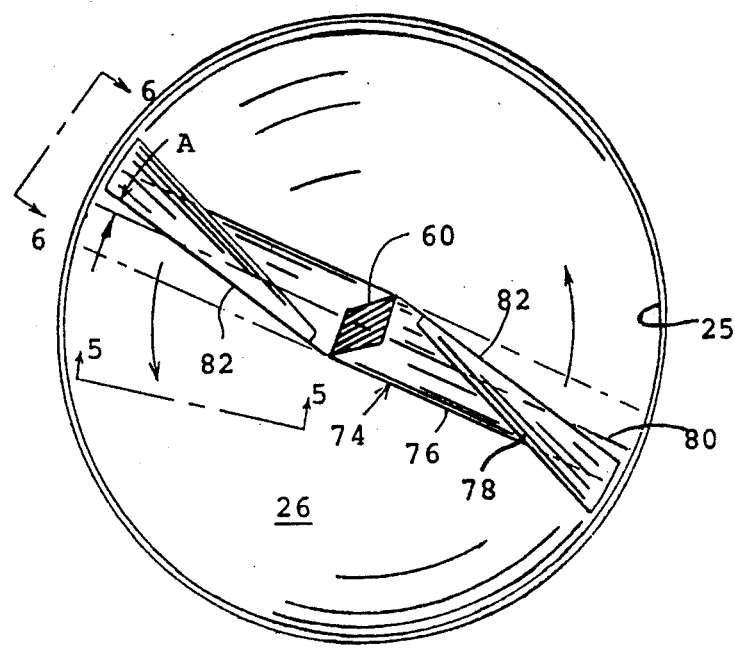
FIG. 4 shows an enlarged view of the transport impeller at the bottom of the receiving tank.

Referring now to FIGS. 1-3 in combination, the reclaiming apparatus 14 is supported on the ground by lower frame members 19 and upper frame members 20. The unitary liquid containment vessel 16 comprises a receiving tank 21 supported on frame members 19 and a discharge tank 22 supported from receiving tank 21 and by upper frame members 20. Tanks 21 and 22 are connected to each other in a fluid-containing fluid-communicating relationship by opening/port 24 in outer wall 25 at the bottom wall 26 of receiving tank 21. Door 28 is opened and closed by power cylinder 30 acting through lever arm 32, whereby the door 28 can permit passage of solid material from tank 21 through opening 24, or can prevent passage of solid material from tank 21 through opening 24 and into the discharge tank 22.

Both receiving tank 21 and discharge tank 22, and all containment connections between the two tanks, are liquid tight such that the two tanks in combination comprise the liquid tight unitary containment vessel designated as 16. Accordingly, and especially when door 28 is open, the liquid levels 98 in both the receiving tank and the discharge tank are the same, as best seen in FIG. 2.

Discharge tank 22 contains a screw conveyor 34 driven by motor 36 at a speed of, e.g., 28 revolutions per minute. Tank 22 is generally shaped around screw conveyor 34. Space accommodation is, of course, made for door 28 and other cooperating apparatus described hereinafter. Conveyor 34 has a receiving end 38 located adjacent opening 24 and a discharge end 40 above the height "H" (shown in FIG. 2) of the top of tank 21. Water spray nozzles 42 are also located above the height "H," near the discharge end 40 of screw conveyor 34, and are positioned to apply washing water to material being conveyed by screw conveyor 34. Two nozzles are shown at the discharge end of the conveyor. More nozzles can be used as desired, and the nozzles can be placed anywhere above the fluid level in the tank 22.

Pump 44 draws fluid material from discharge tank 22 through intake pipe 46 and discharges the material through pipe 48, to pipe 50 as a recycle stream 52 and, as trucks are available for filling, to a truck 54 through pipe 56. Solenoid valve 58 opens and closes pipe 56 to flow of the fluid material to a truck.

Tank 21 has a mixing agitator 59 generally structured about a central vertical shaft 60, and powered by motor 62. Shaft 60 drives an upper paddle 64 and a lower impeller 66 in the direction shown by the arrows in FIG. 1.

Upper paddle 64 comprises a pair of vertical plates 68 extending outwardly from shaft 60 and including a plurality of holes 70, the combination of which provides a turbulent circular motion to the fluid in the upper portion of the receiving tank.

A pair of small winglets 72 are disposed on the bottom edges of vertical plates 68. As seen in FIG. 1, winglets 72 are attached to the bottom of each vertical plate 68 adjacent the joinder of plates 68 with shaft 60, and extend downwardly and rearwardly from plates 68. The rearward direction is taken with respect to the direction of rotation of the shaft and paddles. The affect of winglets 72, upon commencement of rotation of agitator 59 in the direction shown, is to impart a downward force on fluid adjacent shaft 60.

Figure 5:
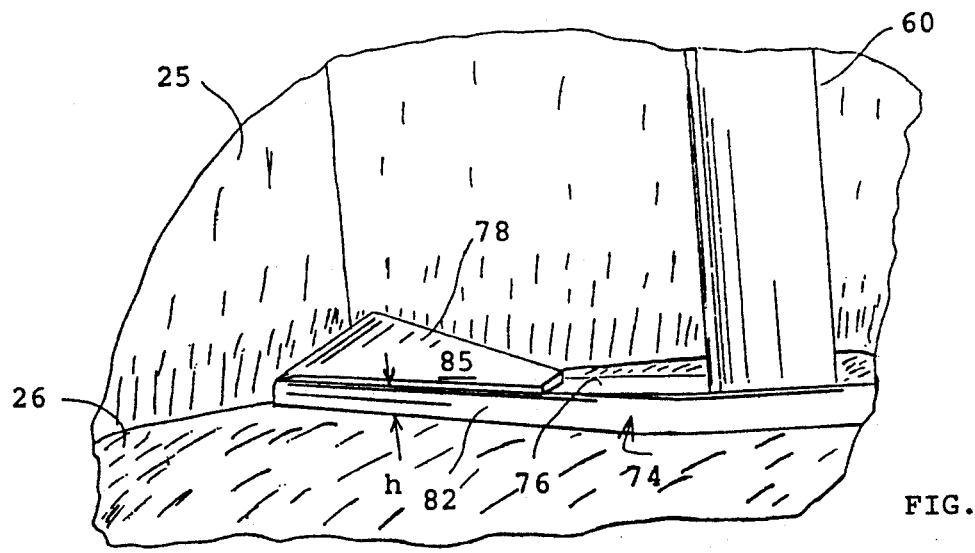
FIG. 5 shows an enlarged fragmentary perspective view of the leading edge of one of the blades of the lower impeller, and is taken at 5—5 of FIG. 4.
Figure 6:
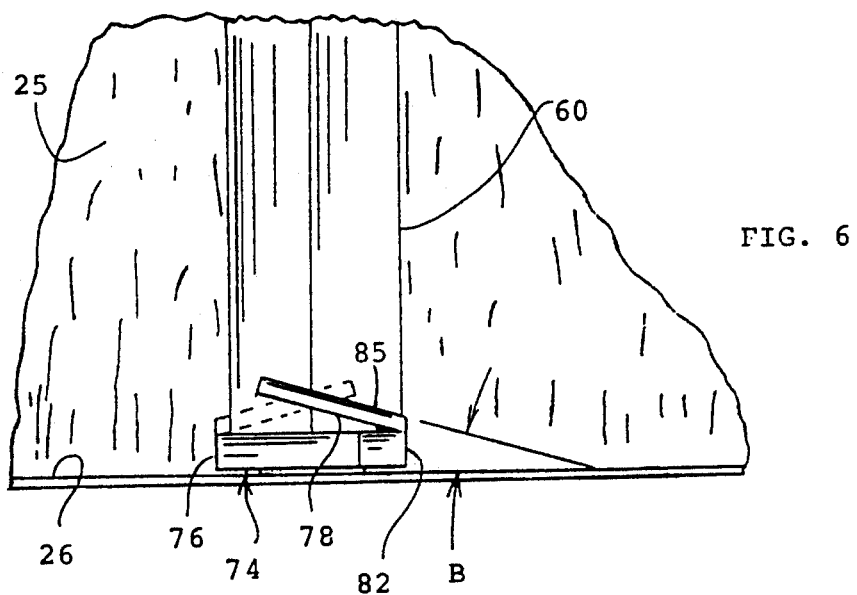
FIG. 6 shows an end view of one of the blades of the lower impeller, and is taken at 6—6 of FIG. 4.

Lower impeller 66 comprises a pair of blades 74 disposed for rotation parallel to, and adjacent the bottom wall of the tank. Generally, the lower sides of the blades 74 are disposed within an inch, preferably within 0.5 inch, of the bottom wall 26 of the tank 21. The outer ends of blades 74 are disposed within about 1 inch, preferably within about 0.5 inch, of the outer wall 25. Each blade 74 comprises a base plate 76 and a wing 78. Base plates 76 extend generally outwardly from shaft 60 along a diameter line 80. The leading edges 82 of base plates 76 are generally perpendicular to the bottom wall 26 of the tank, and define a height "h" (best seen in FIG. 5) which serves as a pushing surface whereby the blades push, along the bottom wall of tank 21, any solids material which settles to the bottom of the tank. The dimension of height "h" is not critical so long as the leading edge engages the solids material which settles to the bottom of the tank, and pushes it. A height "h" of 1.5 inches is satisfactory. A minimum height "h" of about 0.25 to about 0.5 inch is believed to be necessary for satisfactory engagement of aggregates commonly used in ready-mix concrete mixes.

Each base plate 76 describes a back-swept angle "A" with respect to diameter 80; the back-sweep being defined with respect to the direction of rotation of the agitator 59. The size of the back-sweep angle is not critical, so long as the leading edges 82 impart a force having an outwardly directed component, to the solid materials being pushed; such that the solid materials are urged toward the outer wall 25 of the receiving tank.

The wings 78 on blades 74 of lower impeller 66 have top surfaces 85 extending upwardly and rearwardly from leading edges 82, and defining an angle "B" of about 15 degrees with the bottom wall 26 of tank 21. The size of angle "B" is not critical so long as the wing has a lifting and mixing affect on the fluid in tank 21. The wing as shown is progressively longer front-to-rear toward the outer wall 25 of the tank, and shorter toward shaft 60. The affect of wings 78, on rotation of agitator 59 in the direction shown is to impart an upward force on fluid adjacent the outer wall 25, with lesser upward forces at lesser distances from shaft 60. No significant upward force is applied by wing 78 near shaft 60.

Accordingly, upon rotation of agitator 59, including shaft 60, upper paddle 64 including winglets 72, and lower impeller 66 including wings 78, a torroidal (donut-shaped) mixing action is set up in tank 21. As illustrated by the arrows in FIG. 2, the fluid adjacent outer wall 25 is thus urged upwardly by wings 78 while fluid adjacent shaft 60 is urged downwardly by winglets 72. Simultaneously, a circular direction of liquid mixing is urged in the upper portion of tank 21 by the vertical orientation of paddles 64. The net result of rotation of agitator 59 is an effective and efficient mixing of the contained fluid.

In preparation for operating the system, an initial charge of diluting water is placed into receiving tank 21. Typically door 28 is closed when the system is de-energized. When closed, door 28 is a barrier to passage of solids such as the aggregates. It is not a barrier to passage of water. Accordingly, water will flow past door 28 into discharge tank 22. Tank 22 is thus automatically charged through opening 24.

In preparation for mechanically agitating the system, the electrical control system is energized at control box 86 by activating the main power switch 88. This energizes a variety of conventional sensors and controls that operate the system as described following. Motor 62 is energized and begins its continuous rotation of agitator 59 at a slow speed of, e.g., about 10-40 rpm, preferably about 15-30 rpm. Thus, any liquid in tank 21 is continuously mixed as described. Door 28 remains closed. Motor 36 of screw conveyor 34 is typically not energized at this time. Pump 44 is off.

When a truck has unused concrete to discard, it places its discharge chute 90 over receiving tank 21 which has been prepared as above. The truck operator then activates control switch 92, and sets a timer which activates screw conveyor 34 and spray nozzles 42, and opens door 28, all for the period of time set by the truck operator. The truck operator then discharges the unused material 94 through grating 96 into receiving tank 21 as shown in FIG. 2. When the fluid concrete mix enters receiving tank 21, the diluting affect reduces the overall viscosity of the resulting diluted mixture enough that the aggregates, and much of the sand, are released from the mixture and settle to the bottom of the tank. The constant mixing by agitator 59, however, retains the cement in suspension with the water, and retains some of the fines particles of sand. The amount of sand released from the mixture, to the bottom of the tank varies with the several operating parameters such as overall viscosity, turbulence, additives, and the like. In general, all of the aggregates are released, and most of the sand is released from the mixture when the concrete is diluted. Some fraction of fine sand is retained in the remainder mixture, with the water and cement. However, this fines fraction generally represents only a small fraction of the sand in the original mixture.

As the aggregates and sand components settle to the bottom of tank 21, they are pushed, by the action of blades 74, ahead of the leading edges 82 of blades 74. As the sand and aggregates are pushed, the combination of the rotating direction of movement of blades 74, and the back-sweep on leading edges 82 of the blades, causes the sand and aggregates to travel around the bottom of tank 21 in an expanding spiral, such that they ultimately are urged around the tank against outer wall 25. As they traverse outer wall 25, they ultimately reach opening 24 and are discharged through opening 24. As the sand and aggregates solids pass through opening 24, they drop downwardly into the receiving end 38 of screw conveyor 34 and are conveyed by conveyor 34 upwardly toward its discharge end 40. As the solids traverse conveyor 34, they pass above the level 98 of the contained fluid and begin to drain off entrained liquid. Finally, they pass under water spray nozzles 42 and are further washed. The wash water flows down conveyor 34 and into the tank. The cleaned sand and aggregates are discharged at the discharge end 40 of the screw conveyor 34 onto sand and aggregates conveyor 18, or other receiving means. The sand and aggregates are thus reclaimed clean and can be routinely used in making up a fresh concrete mix.

The settling and separation of aggregates and sand from a given charge of concrete mix into tank 21 continues for a period of several minutes. Generally, substantially all of the solids which will settle out from a charge of 2 cubic yards of concrete have done so and have been discharged from conveyor 34 within about 20 minutes after the concrete mix is charged into tank 21. Once all of that material has been discharged, screw conveyor 34 can be stopped. But by that time, the truck operator will have left the area. No operator need generally be in attendance at the reclamation apparatus. So the screw conveyor 34 is controlled for shut off by the timer in the control box 86. The conveyor 34 can be observed periodically to ascertain the proper amount of running time and the timer set or adjusted accordingly; such that conveyor 34 is normally "off," and is activated for a time selected by the truck operator when a charge of concrete mix is discharged into tank 21. When the timer shuts off conveyor 34, it also closes door 28. Thus the normal position for door 28 is "closed."

A plurality of charges of unused fluid concrete mix can be discharged into tank 21 as needed. With each charge, door 28 is opened and screw conveyor 34 is activated. Within a few minutes, the bulk of the charge, namely the sand and aggregates, has been discharged from conveyor 34. Since the major part of the volume in the concrete mixture is comprised of the sand and aggregates, only a small fraction of the material received into receiving tank 21 actually remains in the unitary liquid containment vessel 16. Accordingly, vessel 16 can be relatively small.

Examples of a typical concrete mix for one cubic yard are as follows

| Ingredient | | Mix 1, Lbs. | Mix 2, Lbs. |
|---|---|---|---|
| Concrete | 5 bags @ 95 lbs. | 470 | 470 |
| Water | 36 gal. @ 8.3 lbs/gal | 299 | 299 |
| Sand | ... | 1650 | 1200 |
| Aggregates | ... | 1650 | 1800 |
| Total weight of 1 cubic yard of concrete | | 4069 Lbs. | 4769 Lbs. |

It will be appreciated that there is a wide variety of ingredient combinations, especially differences in the amounts and kinds of sand and aggregates, representative of conventional concrete mixing practice. The performance of the reclamation apparatus illustrated herein varies accordingly, reflecting the fact that the coarser the aggregates and sands the more quickly and more completely they are separated out. Thus, the reclamation apparatus separates out more, or less, sand and aggregates, more, or less, quickly, on a given batch of concrete mix, depending on the particular formula of the concrete mix.

Potentially up to about 80% of the material discharged into tank 21 can be removed at screw conveyor 34. Correspondingly, only about 20%, up to about 25%, is retained in tank 21, along with the necessary amount of diluting water. Thus, tank 21 can be sized to hold about 20% to about 25% of the volume of the material to be discharged into it on any given maximum-use day, with suitable additional allowance for diluting water, including wash water.

EXAMPLE

An experimental reclaiming apparatus was set up as follows. Tank 21 was a round tank as illustrated in the drawings, having a capacity of 2300 gallons, and paddles and impeller generally as shown. Speed of rotation of shaft 60 was about 15 revolutions per minute (rpm). Tank 22 had a conventional screw conveyor having standard 22 degree screw flighting. Screw conveyor speed was 28 rpm. Pump 44, suitable for pumping abrasive solids, was secured from Deming Pump division of Crane Corporation, Salem, Ohio.

Two cubic yards of conventional 5-bag mix concrete were prepared. 300 gallons of diluting water were charged into tank 21. The system was activated. The two cubic yard charge was put into receiving tank 21. Clean sand and aggregates were recovered from screw conveyor 34. All of the recoverable sand and aggregates were recovered within 20 minutes. The remainder mixture was readily maintained in a generally uniform suspension by the continuous mixing of agitator 59.

The 2300 gallon tank used in the above experiment has the capacity to process up to at least about 11 cubic yards of concrete mix without any discharge of the remainder mixture of cement, water, and sand fines. Namely, approximately 1 cubic yard of concrete mix can be reclaimed for each 200 gallons of capacity in agitated tankage. The 2300 gallon capacity is convenient and desirable because a tank this size can be transported on a truck as a standard size load. Other sizes could, of course, be used. However, if greater capacity is needed, it is preferred to incorporate into the system a holding tank 100 (shown in FIG. 1), in fluid communication with tank 21 by preferably a spillover weir 102. Tank 100, when used, incorporates a second agitator 59 which is continuously operated when there is fluid suspension material in tank 100. Then, whenever tank 21 gets full, any excess spills over into tank 100 through weir 102. The cement and sand fines in both tanks 21 and 100 are thus kept in suspension by the continuous operation of both agitators. Agitated tanks 100, further include pumps 44, near their bottoms, and pipes 48, 50, and 56, and solenoid valves 58, all for delivering the remainder mixture to trucks for use in making up fresh batches of concrete. If needed to meet the plant capacity demands, additional holding tanks 100, with agitators and pumping systems, can be added, typically in series, and with connecting weirs.

Materials are recovered from the reclamation apparatus described herein in two different forms. First, the sand and aggregates are recovered as solids from the discharge end of screw conveyor 34. If desired, the sand and aggregates components can be segregated from each other by use of conventional screening classifiers (not shown). However, usually the same ratio of sand and aggregates recovered from conveyor 34 will be used again, whereby the recovered mixture of sand and aggregates can be stored as a mixture and re-used as is.

Second, the remainder mixture of concrete, water, and sand fines, retained in receiving tank 21 is held in tank 21 as re-usable liquid slurry. Generally, any small amount of concrete mix left over from a given job will be kept in the truck and incorporated into the subsequent batch which is mixed up and sent out on the next delivery for that truck on the same day. Thus, generally, no concrete mix will be dumped into the reclamation apparatus until the trucks return from their last delivery of the day. As each truck returns from its last delivery, it dumps its unused portion of fluid concrete mix into tank 21 and the mix is processed as discussed above; conveying out the sand and aggregate and holding the concrete, water and sand fines in the slurry mixture.

The slurry of the remainder mixture is generally maintained in tank 21, but a volumetric proportion of it does flow into discharge tank 22 along with the sand and aggregates through opening 24.

Generally all, or almost all, of the unused concrete mix which is received into the reclaiming apparatus is received at the end of the production day when trucks are being cleaned out for overnight parking. Since it is the end of the production day, no fresh batches are being made and sent out. Thus, none of the reclaimed material is being re-used at that time. Rather it is held, generally overnight, until the next production day, and used then. Accordingly, the number of holding tanks 100 is selected such that tank 21 plus the holding tanks, if any, can receive and process all of the usual amount of unused concrete mix on the busiest day (typically about 3% to about 7% of the day's production), and can hold the remainder mixture in suspension with mixing until the next production day. The number of agitating tanks, 21 and 100, will vary from plant to plant, depending on (1) the maximum amount of concrete mix that has to be recycled for a day's operation and (2) the amount of the concrete mix that must be retained by the agitating tanks. Generally, one 2300 gallon agitated tank will be specified for each 100-150 cubic yards, or fraction thereof, of capacity of the ready-mix plant.

As fresh batches of concrete ready-mix are being made up the next day, the agitated slurry from tanks 21 and 100 is incorporated into the fresh batches and used up as quickly as possible. When possible, enough of the remainder mixture is used to supply all of the water required for the fresh batch. The active strength contribution of the cement contained in that amount of water is calculated, from a fresh sample of the remainder mixture, and the amount of fresh cement used in the batch is reduced accordingly. Thus the remainder mixture is fully used up, and tanks 21, 22, and 100 are emptied as soon as possible in every production day. When tanks 21 and 22 are empty, they are recharged with a fresh batch of diluting water so they are ready to receive the day's supply of unused concrete from returning trucks.

When a truck 54 is to receive a quantity of the remainder mixture of cement, water, and sand fines, from liquid containment vessel 16 as part of the ingredients in making up a fresh batch of concrete, the end of pipe 56 is directed into the drum on the truck as shown in FIG. 1. Switch 104 is activated on control box 86. This opens door 28, energizes pump 44, and opens solenoid valve 58. As pump 44 operates, it draws remainder mixture fluid from tank 22 near opening 24 in tank 21 and delivers it to both pipes 50 and 56. Through pipe 56, the fluid is delivered to the truck 54, which is its ultimate goal. Recycle fluid 52 flows, simultaneously, through pipe 50.

When the desired quantity of remainder fluid has been received in truck 54, switch 104 is de-activated, which shuts off pump 44, closes solenoid valve 58, and closes door 28. Pipes 50 and 56 drain by gravity.

Since the operation of the system herein depends on a certain amount of continuous mixing of the suspended remainder mixture, the viability of the reclamation operation can be threatened when mixing of the remainder mixture stops long enough for the solids to settle out of suspension and to form a hard mass of material. While the system is in operation, mixing in an agitated tank (e.g. tank 21) is maintained by agitator 59, whereby settling out is avoided in tank 21. It has been found that no mixing is needed in tank 22 for as long as over a long weekend. So screw conveyor 34 generally need not be activated for mixing purposes unless the remainder mixture will be held for an unusually longer period of time (e.g. greater than 4 days).

Pump 44 and pipe 48, however, are more sensitive to the settling of solids out of suspension. Accordingly, pump 44 is controlled by a timer in control box 86 such that pump 44 is operated, in the recycle mode, pumping the remainder mixture through pipes 46, 48, and 50, for a few minutes (e.g. 5 minutes) at set intervals. The time interval is selected such that the pump is always activated before the settling of the solids which are in suspension causes the material to become difficult to pump, whereby the recycling maintains the fluidity of the remainder mixture in pump 44 and in the recycle loop. In the apparatus as illustrated herein, the pump is operated in the recycle mode at least once each night, preferably twice each night.

In another control system, pump 44 is operated for a few minutes at a regularly set maximum interval, again through a timer in control box 86. Whenever pump 44 is activated, such as to deliver material to a truck 54, the timer is automatically reset. However, when the pump is not otherwise activated, the timer activates the pump at the set maximum interval. For example, with the interval set at 6 hours, whenever the pump has been de-energized for an uninterrupted period of 6 hours, then the timer activates the pump for e.g. 5 minutes and resets itself for another 6 hours. Accordingly, the pump is never de-energized for more than e.g. 6 hours at a time.

During the recycle pumping, solenoid valve 58 is closed, door 28 is open, and screw conveyor 34 is de-energized. Screw conveyor 34 is electrically locked out at control box 86 when pump 44 is running. Also pump 44 is electrically locked out, and thus prevented from running, when screw conveyor 34 is energized. The result is that pump 44 and conveyor 34 cannot both run at the same time. this provides protection for pump 44, by ensuring that the pump is not running when screw conveyor 34 is causing significant mixing and/or turbulence by its operation in tank 22.

Within a broader context, the invention herein comprises a generic solids classifying system, for separating solids material from any mixture wherein the mixture comprises a first discrete-phase solids component to be recovered therefrom, a second discrete-phase solids component to be retained therein, and a continuous-phase carrying fluid, the solids classifying system comprising the above described apparatus. Namely, the system will perform the separation where there is a first treatment factor, for example a dilution factor that, in combination with a second mixing factor, will cause separation of the first discrete-phase solids material while holding the second discrete-phase solids material in suspension.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. Reclaiming apparatus for reclaiming an unused fluid concrete mixture comprising water, cement, sand, and aggregate, for use in production of fresh concrete, said reclaiming apparatus comprising a unitary liquid containment vessel, said liquid containment vessel comprising:
 (a) a receiving tank, having a bottom, an outer wall, an outer wall, and a top, said receiving tank comprising means for inletting an initial charge of diluting water into the receiving tank, means for inletting an unused fluid concrete mixture into the receiving tank, and a mixing agitator having a central vertical shaft, a pair of vertical plates joined to the shaft and spaced from the bottom of the tank and spaced from the top of the receiving tank, the plates extending outwardly from the shaft, the plates having portions defining a plurality of holes, the plates further having a plate edge disposed toward the bottom of the tank, the plate edge having a winglet attached to the plate edge and adjacent to the shaft and extending downwardly and rearwardly of the shaft, the mixing agitator further having a lower impeller whereby the mixing agitator maintains constant mixing of the contents of said receiving tank, said receiving tank receiving the unused fluid concrete mixture and an initial charge of diluting water and mixing the received unused fluid concrete mixture with the diluting water, such that the diluting water in combination with constant mixing effects separation of the concrete mixture whereby sand and aggregate settle to said bottom of said receiving tank while the cement solids, a fines portion of the sand, and the water comprise a generally uniformly dispersed remainder mixture, said receiving tank having an opening therein at said bottom thereof, on said outer wall;
 (b) a discharge tank, connected with said receiving tank, and in fluid-communicating relationship therewith, through said opening at said bottom of said receiving tank, such that material in said receiving tank can be discharged from said receiving tank through said opening and into said discharge tank, said discharge tank having therein a conveyor, said conveyor having
  (i) a receiving end thereof adjacent said opening in said receiving tank and disposed to receive material discharged from said receiving tank through said opening, and
  (ii) an open discharge end thereof disposed at a height higher than the receiving tank top, whereby a surface level of the remainder mixture in said discharge tank and a surface level of the remainder mixture in said receiving tank are substantially the same;
 (c) a door over said opening in said receiving tank, and control means operable such that said door can be opened for transport of sand and aggregate from said receiving tank to said discharge tank, and thereby to said receiving end of said conveyor, and can be closed to prevent transport of sand and aggregate from said receiving tank to said discharge tank; and
 (d) transport means in said receiving tank for transporting sand and aggregate to said opening, and for urging the sand and aggregate through said opening,
whereby the sand and aggregate are thereby received in said discharge tank at said receiving end of said conveyor, are transported by said conveyor to said discharge end thereof, and are thereby discharged from said conveyor and from said discharge tank and said unitary liquid containment vessel.

2. Reclaiming apparatus as in claim 1 further including transfer means adapted to transfer the generally uniformly dispersed remainder mixture of cement and water from said unitary liquid containment vessel to a truck.

3. Reclaiming apparatus as in claim 1, wherein said transport means in said receiving tank comprises said impeller, said impeller having blades thereon, said impeller being mounted for rotation of said blades parallel to, and adjacent, said bottom of said receiving tank, said impeller blades having lower sides disposed within an inch of the bottom wall of the receiving tank and having blade outer ends disposed within one inch of the outer wall of the receiving tank, said blades being adapted to transport sand and aggregate along said bottom of said receiving tank and to said opening at said bottom on said outer wall thereof, and to urge the sand and aggregate through said opening.

4. Reclaiming apparatus as in claim 3 wherein said blades of said impeller have top surfaces thereof defining angles of about 15 degrees with said bottom of said receiving tank, and extending upwardly and rearwardly with respect to the direction of rotation of said blades.

5. Reclaiming apparatus as in claim 3, said impeller blades having front surfaces, defined with respect to the direction of rotation of said impeller, disposed in an orientation generally perpendicular to said bottom of said receiving tank, said perpendicular front surfaces being adapted to engage and push the aggregate, which settles to said bottom of said tank, along said bottom of said tank.

6. Reclaiming apparatus as in claim 5, wherein said impeller blades extend, from a central drive means, outwardly toward the outer wall of said receiving tank, and being back-swept with respect to the direction of rotation of said impeller blades such that said front surfaces impart an outwardly directed force adapted to move the aggregate toward said outer wall, said impeller blades further having angled top surfaces, whereby said impeller performs the combination of functions of both transporting the sand and aggregate solids along said bottom of said receiving tank with said front surfaces of said blades, and providing mixing of said remainder mixture with said angled top surfaces of said blades.

7. Reclaiming apparatus as in claim 1 wherein said reclaiming apparatus has the capacity to process at least about 1 cubic yard of unused fluid concrete mix for each 200 gallons of tankage capacity in said reclaiming apparatus and to process 2 cubic yards of said unused fluid concrete mixture in about 20 minutes after the unused fluid concrete mixture is discharged into the receiving tank.

8. Reclaiming apparatus as in claim 1, further including a holding tank connected with said receiving tank through a spill-over weir and in fluid communication with said receiving tank, said holding tank being adapted to receive a portion of said remainder mixture from said receiving tank, said holding tank further having a holding tank agitator for maintaining said remainder mixture as a generally uniform suspension, said holding tank having a holding tank pump with associated piping defining both a discharge opening for discharging the remainder mixture into a truck and a recycle transport loop.

9. Reclaiming apparatus for reclaiming an unused fluid concrete mixture comprising water, cement, sand, and aggregate, for use in production of fresh concrete, said reclaiming apparatus comprising a unitary liquid containment vessel, said liquid containment vessel comprising:
  (a) a receiving tank, having a bottom and a top, said receiving tank comprising means for inletting diluting water into said receiving tank, means for inletting an unused fluid concrete mixture into said receiving tank, and mixing means for maintaining constant mixing of the contents of said receiving tank, said receiving tank receiving the unused fluid concrete mixture and the diluting water and mixing the receiving unused fluid concrete mixture with the diluting water, such that the diluting water in combination with constant mixing effects separation of the concrete mixture whereby sand and aggregate settle to said bottom of said receiving tank while the cement solids, a fines portion of the sand, and the water comprise a generally uniformly dispersed remainder mixture, said receiving tank having an opening therein at said bottom thereof;
  (b) a discharge tank, connected with said receiving tank, and in fluid-communicating relationship therewith, through said opening at said bottom of said receiving tank, such that material in said receiving tank can be discharged from said receiving tank through said opening and into said discharge tank, said discharge tank having therein a conveyor, said conveyor having
    (i) a receiving end thereof adjacent said opening in said receiving tank and disposed to receive material discharged from said receiving tank through said opening, and
    (ii) an open discharge end thereof disposed at a height higher than the receiving tank top, whereby a surface level of the remainder mixture in said discharge tank and a surface level of the remainder mixture in said receiving tank are substantially the same;
  (c) a door over said opening in said receiving tank, and control means operable such that said door can be opened for transport of sand and aggregate from said receiving tank to said discharge tank, and thereby to said receiving end of said conveyor, and can be closed to prevent transport of sand and aggregate from said receiving tank to said discharge tank;
  (d) transport means in said receiving tank for transporting sand and aggregate to said opening, and for urging the sand and aggregate through said opening, whereby the sand and aggregate are thereby received in said discharge tank at said receiving end of said conveyor, are transported by said conveyor to said discharge end thereof, and are thereby discharged from said conveyor and from said discharge tank and said unitary liquid containment vessel; and
  (e) transfer means adapted to transfer the generally uniformly dispersed remainder mixture of cement and water from said unitary liquid containment vessel to a truck, wherein said transfer means comprises a pump, and intake piping mounted to draw intake fluid to said pump from said discharge tank.

10. Reclaiming apparatus as in claim 9, further including control means for activating said conveyor, and said pump and for opening said door over said opening when either said conveyor or said pump is activated and for closing said door over said opening when neither said pump nor said conveyor is activated.

11. Reclaiming apparatus as in claim 9 and including control means adapted to activate said conveyor and said pump, to electrically lock out said pump when said conveyor is activated and to electrically lock out said conveyor when said pump is activated.

12. Reclaiming apparatus for reclaiming an unused fluid concrete mixture comprising water, cement, sand, and aggregate, for use in production of fresh concrete, said reclaiming apparatus comprising a unitary liquid containment vessel, said liquid containment vessel comprising:
  (a) a receiving tank, having a bottom and a top, said receiving tank comprising means for inletting diluting water into said receiving tank, means for inletting an unused fluid concrete mixture into said receiving tank, and mixing means for maintaining constant mixing of the contents of said receiving tank, said receiving tank receiving the unused fluid concrete mixture and the diluting water and mixing the received unused fluid concrete mixture with diluting water, such that the diluting water in combination with constant mixing effects separation of the concrete mixture whereby sand and aggregate settle to said bottom of said receiving tank while the cement solids, a fines portion of the sand, and the water comprise a generally uniformly dispersed remainder mixture, said receiving tank having an opening therein at said bottom thereof;
  (b) a discharge tank, connected with said receiving tank, and in fluid-communicating relationship therewith, through said opening at said bottom of said receiving tank, such that material in said receiving tank can be discharged from said receiving tank through said opening and into said discharge tank, said discharge tank having therein a conveyor, said conveyor having
    (i) a receiving end thereof adjacent said opening in said receiving tank and disposed to receive material discharged from said receiving tank through said opening, and
    (ii) an open discharge end thereof disposed at a height higher than the receiving tank top, whereby a surface level of the remainder mixture in said discharge tank and a surface level of the remainder mixture in said receiving tank are substantially the same;
  (c) a door over said opening in said receiving tank, and control means operable such that said door can be opened for transport of sand an aggregate from said receiving tank to said discharge tank, and thereby to said receiving end of said conveyor, and can be closed to prevent transport of sand and aggregate from said receiving tank to said discharge tank;

(d) transport means in said receiving tank for transporting sand and aggregate to said opening, and for urging the sand and aggregate through said opening, whereby the sand and aggregate are thereby received in said discharge tank at said receiving end of said conveyor, are transported by said conveyor to said discharge end thereof, and are thereby discharged from said conveyor and from said discharge tank and said unitary liquid containment vessel; and (e) transfer means adapted to transfer the generally uniformly dispersed remainder mixture of cement and water from said unitary liquid containment vessel to a truck, wherein said transfer means comprises a pump and associated piping defining both a discharge opening for discharging the mixture of cement and water into a truck, and a recycle transport loop between said pump and said liquid containment vessel, and control means adapted to automatically activate said pump and thereby effect pumping of the remainder mixture from said liquid containment vessel through said recycle loop, with said truck discharge opening closed, at prescribed time intervals, to thereby maintain fluidity of the remainder mixture of water, cement, and sand fines in said pump and in said recycle loop of piping.

13. A concrete ready-mix plant having a maximum daily capacity for mixing and delivering ready-mix concrete, said concrete ready-mix plant comprising:

(a) means for mixing cement, water, sand, and aggregate to make a fluid ready-mix concrete mixture and for delivering the fluid concrete mixture to users thereof; and (b) reclaiming apparatus for reclaiming unused portions of the fluid concrete mixture, for use in production of fresh ready-mix concrete, said reclaiming apparatus comprising a unitary liquid containment vessel, said liquid containment vessel comprising (i) a receiving tank, having a bottom and a top, said receiving tank comprising means for inletting an initial charge of diluting water into said receiving tank, means for inletting an unused fluid concrete mixture into said receiving tank, mixing means for maintaining constant mixing of the contents of said receiving tank, said receiving tank receiving the unused portions of the fluid concrete mixture and the diluting water and mixing the receiving unused portion of the fluid concrete mixture with the diluting water, such that the diluting water in combination with constant mixing effects separation of the unused portions of the concrete mixture whereby sand and aggregate settle to said bottom of said receiving tank while the cement solids, a fines portion of the sand, and the water comprise a generally uniformly dispersed remainder mixture, said receiving tank having an opening therein at said bottom thereof, (iii) a discharge tank connected with said receiving tank, and in fluid-communicating relationship therewith through said opening, such that material in said receiving tank can be discharged from said receiving tank through said opening and into said discharge tank, said discharge tank having therein a conveyor, said conveyor having 1. a receiving end thereof adjacent said opening in said receiving tank and disposed to receive material discharged from said receiving tank through said opening, and 2. an open discharge end thereof disposed at a height higher than the receiving tank top whereby a surface level of the remainder mixture in said discharge tank and a surface level of the remainder mixture in said receiving tank are substantially the same, (iii) a door over said opening in said receiving tank, said door having control means thereon operable such that said door can be opened for transport of sand and aggregate from said receiving tank to said discharge tank, and thereby to said receiving end of said conveyor, and can be closed to prevent transport of sand and aggregate from said receiving tank to said discharge tank, (iv) transport means in said receiving tank for transporting the settled sand and aggregates to said opening, and for urging the sand and aggregates through said opening, whereby the settled sand and aggregates are thereby received in said discharge tank at the receiving end of said conveyor, are transported by said conveyor to said discharge end thereof, and are thereby discharged from said conveyor and from said discharge tank and said unitary liquid containment vessel, and (v) transfer means for transfering the remainder mixture from said unitary liquid containment vessel to a truck, said transfer means comprising a pump and associated piping defining both a discharge opening for discharging the remainder mixture into a truck, and a recycle transport loop between said pump and said liquid containment vessel, and control means adapted to automatically activate said pump and thereby effect pumping of the remainder mixture from said liquid containment vessel through recycle loop, with said truck discharge opening closed, at prescribed time intervals, to thereby maintain fluidity of the remainder mixture in said pump and in said recycle loop of piping, said unitary liquid containment vessel being sized to receive and process a normal unused fraction of the maximum daily capacity of said ready-mix plant, and to retain in said unitary containment vessel the water and cement portions of the normal unused fraction of the maximum daily capacity of said ready-mix plant, along with diluting water and a suspended fines portion of the sand.

14. A concrete ready-mix plant as in claim 13, further including control means for activating said conveyor, and said pump and for opening said door over said opening when either said conveyor or said pump is activated and for closing said door over said opening when neither said pump not said conveyor is activated.

15. A concrete ready-mix plant as in claim 13 and including control means adapted to activate said conveyor and said pump, to electrically lock out said pump when said conveyor is activated and to electrically lock out said conveyor when said pump is activated.

16. A concrete ready-mix plant as in claim 13 wherein said reclaiming apparatus has a capacity of agitated tankage of about 2300 gallons for each 150 cubic yards, or fraction thereof, of production capacity of said concrete ready-mix plant and has the capacity to process 2 cubic yards of unused fluid concrete mixture in about 20 minutes after the unused fluid concrete mixture is discharged into the receiving tank.

17. A concrete ready-mix plant as in claim 13, further including a holding tank connected with said receiving tank through a spill-over weir and in fluid communication with said receiving tank, said holding tank being adapted to receive a portion of said remainder mixture from said receiving tank, said holding tank further having a holding tank agitator for maintaining said remainder mixture as a generally uniform suspension, said holding tank having a holding tank pump with associated piping defining both a discharge opening for discharging the remainder mixture into a truck and a recycle transport loop.

18. A concrete ready-mix plant having a maximum daily capacity for mixing and delivering ready-mix concrete, said concrete ready-mix plant comprising:
   (a) means for mixing cement, water, and, and aggregate to make a fluid ready-mix concrete mixture and for delivering the fluid concrete mixture to users thereof; and
   (b) reclaiming apparatus for reclaiming unused portions of the fluid concrete mixture, for use in production of fresh ready-mix concrete, said reclaiming apparatus comprising a unitary liquid containment vessel, said liquid containment vessel comprising
      (i) a receiving tank, having a bottom and a top, said receiving tank comprising means for inletting an initial charge of diluting water into said receiving tank, means for inletting a portion of the fluid concrete mixture into said receiving tank, and mixing means for maintaining constant mixing of the contents of said receiving tank, said receiving tank receiving an unused portion of the fluid concrete mixture and diluting water and mixing the received unused portion of the fluid concrete mixture with diluting water, such that the diluting water in combination with constant mixing effects separation of the unused portion of the concrete mixture whereby sand and aggregate settle to said bottom of said receiving tank while the cement solids, a fines portion of the sand, and the water comprise a generally uniformly dispersed remainder mixture, said receiving tank having an opening therein at said bottom thereof,
      (ii) a discharge tank connected with said receiving tank, and in fluid-communicating relationship therewith through said opening, such that material in said receiving tank can be discharged from said receiving tank through said opening and into said discharge tank, said discharge tank having therein a conveyor, said conveyor having
         1. a receiving end thereof adjacent said opening in said receiving tank and disposed to receive material discharged from said receiving tank through said opening, and
         2. an open discharge end thereof disposed at a height higher than the receiving tank top whereby a surface level of the remainder mixture in said discharge tank and a surface level of the remainder mixture in said receiving tank are substantially the same,
      (iii) a door over said opening in said receiving tank, said door having control means thereon operable such that said door can be opened for transport of sand and aggregate from said receiving tank to said discharge tank, and thereby to said receiving end of said conveyor, and can be closed to prevent transport of sand an aggregate from said receiving tank to said discharge tank,
      (iv) transport means in said receiving tank for transporting the settled sand and aggregates to said opening, and for urging the sand and aggregates through said opening, the transport means comprising an impeller, said impeller having blades thereon, said impeller being mounted for rotation of said blades parallel to, and adjacent, said bottom of said receiving tank, said blades being adapted to transport sand and aggregate along said bottom of said receiving tank and to said opening at said bottom thereof, and to urge the sand and aggregate through said opening, whereby the settled sand and aggregates are thereby received in said discharge tank at the receiving end of said conveyor, are transported by said conveyor to said discharge end thereof, and are thereby discharged from said conveyor and from said discharge tank and said unitary liquid containment vessel, said unitary liquid containment vessel being sized to receive and process a normal unused fraction of the maximum daily capacity of said ready-mix plant, and to retain in said unitary containment vessel the water and cement portions of the normal unused fraction of the maximum daily capacity of said ready-mix plant, along with diluting water and a suspended fines portion of the sand.

19. A concrete ready-mix plant as in claim 18 wherein said blades of said impeller have top surfaces thereof defining angles of about 15 degrees with said bottom of said receiving tank, and extending upwardly and rearwardly with respect to the direction of rotation of said blades.

20. A concrete ready-mix plant as in claim 18, said impeller blades having front surfaces, defined with respect to the direction of rotation of said impeller, disposed in an orientation generally perpendicular to said bottom of said receiving tank, said perpendicular front surfaces being adapted to engage and push the aggregate, which settles to said bottom of said tank, along said bottom of said tank.

21. A concrete ready-mix plant as in claim 20, said impeller blades extending from a central drive means, outwardly toward an outer wall of said receiving tank, and being back-swept with respect to the direction of rotation of said impeller blades such that said front surfaces of said blades impart an outwardly directed force adapted to move the gravel toward said outer wall, said impeller blades further having angled top surfaces
   whereby said impeller performs the combination of functions of both transporting the sand and aggregate solids along said bottom of said receiving tank with said front surfaces of said blades, and providing mixing of said remainder mixture with said angled top surfaces of said blades.

22. A concrete ready-mix plant as in claim 18, further including a holding tank connected with said receiving tank through a spill-over weir and in fluid communication with said receiving tank, said holding tank being adapted to receive a portion of said remainder mixture from said receiving tank, said holding tank further having a tank agitator for maintaining said remainder mixture as a generally uniform suspension, said holding tank having a tank pump with associated piping defining both a discharge opening for discharging the remainder mixture into a truck and a recycle transport loop.

23. A concrete ready-mix plant as in claim 18 wherein said remaining apparatus has a capacity of agitated tankage of about 2300 gallons for each 150 cubic yards, or fraction thereof, of production capacity of said concrete ready-mix plant and has the capacity to process 2 cubic yards of unused fluid concrete mixture in about 20 minutes after the unused fluid concrete mixture is discharged into the receiving tank.

24. A solids classifying system, for separating solids material from a mixture, the mixture comprising a first discrete-phase solids component to be recovered therefrom, a second discrete-phase solids component to be retained therein, and a continuous-phase carrying fluid, said solids classifying system comprising a unitary liquid containment vessel, said liquid containment vessel comprising:

(a) a receiving tank, having a bottom, an outer wall, and a top, said receiving tank comprising means for inletting an initial charge of treating material into the receiving tank, means for inletting an unused fluid concrete mixture into the receiving tank, and a mixing agitator having a central vertical shaft, a pair of vertical plates joined to the shaft and spaced from the bottom of the tank and spaced from the top of the receiving tank, the plates extending outwardly from the shaft, the plates having portions defining a plurality of holes, the plates further having a plate edge disposed toward the bottom of the tank, the plate edge having a winglet attached to the plate edge and adjacent to the shaft and extending downwardly and rearwardly of the shaft, the mixing agitator further having a lower impeller whereby the mixing agitator maintains constant mixing of the contents of said receiving tank, said receiving tank receiving a said mixture and mixing the received said mixture with a treating quantity of treating material, such that the treating material in combination with constant mixing effects separation of the said mixture whereby the first discrete-phase solids component settles to said bottom of said receiving tank while said second discrete-phase solids component remains in a generally uniformly dispersed remainder mixture in the fluid therein, said receiving tank having an opening therein at said bottom, on said outer wall thereof;

(b) a discharge tank, connected with said receiving tank, and in fluid-communicating relationship therewith, through said opening, such that material in said receiving tank can be discharged from said receiving tank through said opening at said bottom of said receiving tank, into said discharge tank, said discharge tank having therein a conveyor, said conveyor having (i) a receiving end thereof adjacent said opening in said receiving tank and disposed to receive material discharged from said receiving tank through said opening, and (ii) an open discharge end thereof disposed at a height higher than the receiving tank top, whereby, when the remainder mixture is contained in said containment vessel, the surface level of the remainder mixture in said discharge tank and the surface level of the remainder mixture in said receiving tank are substantially the same;

(c) a door over said opening in said receiving tank, and control means operable such that said door can be opened for transport of the first discrete-phase solids component from said receiving tank to said discharge tank and thereby to said receiving end of said conveyor, and can be closed to prevent transport of the first discrete-phase solids component from said receiving tank to said discharge tank; and (d) transport means in said receiving tank for transporting the first discrete-phase solids component to said opening, and for urging the first discrete-phase solids through said opening, whereby the first discrete-phase solids component is thereby received in said discharge tank at the receiving end of said conveyor, is transported by said conveyor to said discharge end thereof, and is thereby discharged from said conveyor and from said discharge tank and said unitary containment vessel.

25. A solids classifying system as in claim 24, wherein said transport means in said receiving tank comprises said impeller, said impeller having blades thereon and being mounted for rotation of said blades parallel to, and adjacent said bottom of said receiving tank, said blades having lower sides disposed within an inch of the bottom wall of the receiving tank and having outer ends disposed within one inch of the outer wall of the receiving tank, said blades being adapted to transport the first discrete-phase solids component along said bottom of said receiving tank and to said opening at said bottom on said outer wall thereof, and to urge the first discrete-phase solids component through said opening.

26. A solids classifying system as in claim 25, said impeller blades having front surfaces, defined with respect to the direction of rotation of said impeller, disposed in an orientation generally perpendicular to said bottom of said receiving tank, said perpendicular front surfaces being adapted to engage and push the first discrete-phase solids component which settles to said bottom of said tank, along said bottom of said tank.

27. A solids classifying system as in claim 26 wherein said blades of said impeller have top surfaces thereof defining angles of about 15 degrees with the bottom of said receiving tank, and extending upwardly and rearwardly with respect to the direction of rotation of said blades, said impeller blades extending, from a central drive means, outwardly toward an outer wall of said receiving tank, said front surfaces of said blades being back-swept with respect to the direction of rotation of said blades such that said front surfaces impart an outwardly directed force adapted to move the first discrete-phase solids component toward said outer wall, said blades having angled top surfaces whereby said impeller performs the combination of functions of both transporting the first discrete-phase solids component along said bottom of said receiving tank with said front surfaces of said blades, and providing mixing of said remainder mixture with said angled top surfaces of said blades.

28. A method comprising treating, in apparatus of claim 24, a mixture comprising a first discrete-phase solids component to be recovered therefrom, a second discrete-phase solids component to be retained therein, and a continuous-phase carrying fluid, wherein, in the system of said apparatus and said mixture, there is a first treatment factor that, in combination with a second mixing factor, will cause separation of said first discrete-phase solids material while holding the second discrete-phase solids material in suspension, and recovering said first discrete-phase solids material from said system.

29. A solids classifying system as in claim 24, further including a holding tank connected with said receiving tank through a spill-over weir and in fluid communication with said receiving tank, said holding tank being adapted to receive a portion of said remainder mixture from said receiving tank, said holding tank further having a holding tank agitator for maintaining said remainder mixture as a generally uniform suspension, said holding tank having a holding tank pump with associated piping defining both a discharge opening for discharging the remainder mixture into a truck and a recycle transport loop.

30. A method of separating solids material from a mixture comprising a first discrete-phase solids component to be recovered therefrom, a second discrete-phase solids component to be retained therein, and a continuous phase carrying fluid, in separating apparatus comprising a unitary liquid containment vessel, said liquid containment vessel comprising a receiving tank, having a bottom and a top, said receiving tank comprising mean for inletting a treating material into said receiving tank, and means for inletting said mixture into said receiving tank, and mixing means for maintaining constant mixing of the contents of said receiving tank, said receiving tank receiving a said mixture and mixing the received said mixture with a treating quantity of the treating material, such that the treating material in combination with constant mixing effects separation of the said mixture whereby the first discrete-phase solids component separates out of said mixture while said second discrete-phase solids component remains in a generally uniformly dispersed remainder mixture in the carrying fluid, said receiving tank having an opening therein at said bottom thereof; a discharge tank, connected with said receiving tank, and in fluid-communicating relationship therewith, through said opening, such that material in said receiving tank can be discharged from said receiving tank through said opening into said discharge tank, said discharge tank having therein a conveyor, said conveyor having (i) a receiving end thereof adjacent said opening in said receiving tank and disposed to receive material discharged from said receiving tank through said opening, and (ii) an open discharge end thereof disposed at a height higher than the receiving tank top, whereby, when the remainder mixture is contained in said containment vessel, a surface level of the remainder mixture in said discharge tank and a surface level of the remainder mixture in said receiving tank are substantially the same; a door over said opening in said receiving tank, said door having control means thereon operable such that said door can be opened for transport of the first discrete-phase solids component from said receiving tank to said discharge tank and thereby to said receiving end of said conveyor, and can be closed to prevent transport of the first discrete-phase solids component from said receiving tank to said discharge tank; and transport means in said receiving tank for transporting the first discrete-phase solids component to said opening, and for urging the first discrete-phase solids component through said opening, wherein said mixture is unused, fluid ready-mix concrete, said first discrete-phase solids component is a mixture of sand and aggregate, and the contents remaining in said unitary liquid containment vessel after discharge of said sand and aggregate comprises said remainder mixture of water, cement, and a fines portion of sand, said method comprising the steps of:

(a) receiving said mixture into said receiving tank;

(b) treating said mixture with a treating quantity of said treating material in said receiving tank and continuously mixing said contents of said receiving tank, whereby said first discrete-phase solids component separates out of said mixture and is, by said transport means, transported to and urged through said opening and to said receiving end of said conveyor;

(c) conveying said first discrete-phase solids component, by said conveyor, from said receiving end of said conveyor to said discharge end thereof, and discharging said first discrete-phase solids component from said mixture and from said unitary liquid containment vessel, thereby separating said first discrete-phase solids component from said mixture; and (d) pumping said remainder mixture through a pump, and back into ready-mix trucks, and thereby using said remainder mixture in the make-up of fresh ready-mix concrete.

31. A method as in claim 30 wherein said pump, in combination with associated piping, defines both a discharge opening for discharging the mixture of cement and water into a truck and a recycle loop between said pump and said liquid containment vessel, and including pumping portions of said remainder mixture material through said recycle loop, with said truck discharge opening closed, at prescribed time intervals to thereby maintain fluidity of said remainder mixture material in said recycle loop.

32. A method as in claim 31 and including controlling said apparatus, thereby to activate said conveyor and said pump, to electrically lock out said pump when said conveyor is activated, and to electrically lock out said conveyor when said pump is activated.

33. A method as in claim 30 further including controlling said apparatus, thereby to activate said conveyor and said pump, and opening said door over opening in said receiving tank when either said conveyor or said pump is activated and closing said door over said opening when neither said pump nor said conveyor is activated.

34. A method as in claim 30 further including transferring a portion of said remainder mixture to a holding tank, through a spillover weir in fluid communication with said receiving tank, continuously agitating said remainder mixture in both the receiving tank and in the holding tank as a generally uniform suspension and pumping said remainder mixture from said holding tank into trucks for use in making up fresh batches of concrete.

35. A method of separating solids material from a mixture comprising a first discrete-phase solids component to be recovered therefrom, a second discrete-phase solids component to be retained therein, and a continuous phase carrying fluid, in separating apparatus comprising a unitary liquid containment vessel, said liquid containment vessel comprising a receiving tank, having a bottom and a top, said receiving tank comprising means for inletting a treating material into said receiving tank, mean for inletting said mixture, and mixing means for maintaining constant mixing of the contents of said receiving tank, said receiving tank receiving a said mixture and mixing the received said mixture with a treating quantity of a treating material, such that the treating material in combination with constant mixing effects separation of the said mixture whereby the first discrete-phase solids component separates out of said mixture while said second discrete-phase solids component remains in a generally uniformly dispersed remainder mixture in the carrying fluid, said receiving tank having an opening therein at said bottom thereof; a discharge tank, connected with said receiving tank, and in fluid-communicating relationship therewith, through said opening, such that material in said receiving tank can be discharged from said receiving tank through said opening into said discharge tank, said discharge tank having therein a conveyor, said conveyor having (i) a receiving end thereof adjacent said opening in said receiving tank and disposed to receive material discharged from said receiving tank through said opening, and (ii) an open discharge end thereof disposed at a height higher than the receiving tank top, whereby, when the remainder mixture is contained in said containment vessel, a surface level of the remainder mixture in said discharge tank and a surface level of the remainder mixture in said receiving tank are substantially the same; a door over said opening in said receiving tank, said door having control means thereon operable such that said door can be opened for transport of the first discrete-phase solids component from said receiving tank to said discharge tank and thereby to said receiving end of said conveyor, and can be closed to prevent transport of the first discrete-phase solids component from said receiving tank to said discharge tank; and transport means in said receiving tank for transporting the first discrete-phase solids component to said opening, and for urging the first discrete-phase solids component through said opening, said method comprising the steps of:

(a) receiving said mixture into said receiving tank;

(b) treating said mixture with a treating quantity of said treating material in said receiving tank and continuously mixing said contents of said receiving tank, whereby said first discrete-phase solids component separates out of said mixture and is, by said transport means, transported to and urged through said opening and to said receiving end of said conveyor;

(c) conveying said first discrete-phase solids component, by said conveyor, from said receiving end of said conveyor to said discharge end thereof, and discharging said first discrete-phase solids component from said mixture and from said unitary liquid containment vessel, thereby separating said first discrete-phase solids component from said mixture, further including selecting, as said transport means, an impeller, said impeller having blades thereon, said blades being mounted for rotation of said blades parallel to, and adjacent, said bottom of said receiving tank, said blades having top surfaces thereof defining angles of about 15 degrees with said bottom of said receiving tank, said angles extending, from leading edges of said blades adjacent said bottom of said receiving tank, upwardly and rearwardly with respect to the direction of rotation of said blades, said blades being adapted to transport said first discrete-phase solids component along said bottom of said receiving tank and to said opening at said bottom thereof, and to urge said first discrete-phase solids component through said opening.

36. A method as in claim 35 further including selecting as said impeller, a said impeller wherein said blades have front surfaces, defined with respect to the direction of rotation of said impeller, disposed in an orientation generally perpendicular to said bottom of said receiving tank, said perpendicular front surfaces being adapted to engage and push said first discrete-phase solids component, which settle to said bottom of said tank, along said bottom of said tank.

37. A method as in claim 36 further including selecting as said impeller, a said impeller wherein said blades extend, from a central drive means, outwardly toward an outer wall of said receiving tank, and are back-swept with respect to the direction of rotation of said impeller blades such that said front surfaces impart an outwardly directed force adapted to move said first discrete-phase solids component toward said outer wall, wherein said impeller performs the combination of functions of both transporting said first discrete-phase solids component along said bottom of said receiving tank with said front surfaces of said blades, and providing mixing of said remainder mixture with said angled top surfaces of said blades.

38. A method as in claim 35 further including transferring a portion of said remainder mixture to a holding tank, through a spillover weir in fluid communication with said receiving tank, continuously agitating said remainder mixture in both the receiving tank and in the holding tank as a generally uniform suspension and pumping said remainder mixture from said holding tank into trucks for use in making up fresh batches of concrete.

39. A reclaiming apparatus for reclaiming an unused fluid concrete which includes cement and aggregates, said apparatus comprising a receiving tank and a discharge tank in fluid communication with said receiving tank;

said receiving tank including (i) a top, a bottom, a side wall, an outlet port therein at said bottom, a grating over the top of said receiving tank for receiving unused fluid concrete, a charger arranged for inletting water into said receiving tank, said receiving tank receiving and containing unused fluid concrete from a source, and mixing said concrete with water to form a diluted slurry; (ii) a door over said port; (iii) an actuator adapted for opening and closing said door in a predetermined sequence; (iv) an agitator having an upper paddle joined to a vertical shaft, the upper paddle having a pair of vertical plates, said vertical plates having portions defining a plurality of holes, the upper paddle being spaced from said bottom of said receiving tank, the agitator further having an impeller spaced between said paddle and said bottom of said receiving tank with said impeller being disposed adjacent said bottom of said receiving tank, said agitator maintaining constant mixing of said slurry to separate said slurry into an aggregate fluid admixture on said bottom of said receiving tank and a cement water admixture thereabove; and (v) a transporter arranged for transporting said aggregate fluid admixture along said bottom and discharging same through said port;

said discharge tank including a biased conduit and a conveyor therein, said conduit having a receiving end adjacent said port at said bottom of said receiving tank and a discharge end positioned at a height higher than said top of said receiving tank.

40. The reclaiming apparatus of claim 39 wherein said transporter comprises said impeller, said impeller having blades thereon and being mounted for rotation of said blades parallel to and adjacent said bottom of said receiving tank, said impeller blades having lower sides disposed within an inch of the bottom of said receiving tank and having blade outer ends disposed within one inch of said outer wall of said receiving tank, said blades for transporting the aggregate fluid admixture along said bottom of said receiving tank and to said port at said bottom on said outer wall thereof, and for urging the aggregate fluid admixture through said port.

41. The reclaiming apparatus of claim 40 wherein said blades of said impeller have top surfaces thereof angled at about 15 degrees to said bottom of said receiving tank, and extending upwardly and rearwardly with respect to the direction of rotation of said blades.

42. The reclaiming apparatus of claim 39 further comprising a pump and intake piping mounted to draw said cement water admixture to said pump from said discharge tank wherein said actuator activates said conveyor and said pump and electrically locks out said pump when said conveyor is activated, and electrically locks out said conveyor when said pump is activated and opens said door when either said pump or said conveyor is activated and closes said door when neither said pump or said conveyor is activated.

43. The reclaiming apparatus of claim 42, and further comprising associated piping attached to said pipe, said piping defining both a discharge opening for transferring said cement water admixture to a truck and a recycle transport loop between said pump, said discharge tank and said receiving tank wherein the actuator automatically activates said pump and effects pumping of the cement water admixture from said discharge tank through said recycle loop into said receiving tank, with said truck discharge opening closed, at prescribed time intervals, to thereby maintain fluidity of the cement water admixture in said pipe and in said recycle loop of said piping.

44. The reclaiming apparatus of claim 39 wherein said reclaiming apparatus has the capacity to process at least about 1 cubic yard of unused fluid concrete for each 200 gallons of tankage capacity in said reclaiming apparatus and has the capacity to process 2 cubic yards of unused fluid concrete in about 20 minutes after the unused fluid concrete is discharge into the receiving tank.

45. The reclaiming apparatus of claim 39, further including a holding tank connected with said receiving tank through a spill-over weir and in fluid communication with said receiving tank, said holding tank being adapted to receive a portion of said cement water admixture from said receiving tank, said holding tank further having a holding tank agitator for maintaining said cement water admixture as a generally uniform suspension.

* * * * *